United States Patent [19]

Serizawa et al.

[11] Patent Number: 4,733,335

[45] Date of Patent: Mar. 22, 1988

[54] VEHICULAR LAMP

[75] Inventors: Hiroyuki Serizawa; Masaru Saaki; Jiro Miyagawa, all of Shizuoka; Toshinobu Takasaki, Tokyo; Kenji Arima, Shizuoka, all of Japan

[73] Assignee: Koito Manufacturing Co., Ltd., Tokyo, Japan

[21] Appl. No.: 812,592

[22] Filed: Dec. 23, 1985

[30] Foreign Application Priority Data

| Dec. 28, 1984 | [JP] | Japan | 59-276805 |
| Feb. 5, 1985 | [JP] | Japan | 60-19301 |
| Mar. 11, 1985 | [JP] | Japan | 60-48066 |
| Oct. 21, 1985 | [JP] | Japan | 60-233526 |

[51] Int. Cl.$^4$ .............................. B60Q 1/00
[52] U.S. Cl. .................... 362/80; 362/373; 362/800; 340/84
[58] Field of Search ............... 362/61, 80, 268, 294, 362/800, 368, 373, 246, 234, 235, 326, 327, 331, 296, 297, 308; 340/87, 84, 97

[56] References Cited

U.S. PATENT DOCUMENTS

| 4,345,38 | 8/1982 | Mouyard et al. | 362/246 |
| 3,432,808 | 3/1969 | Fleece | 362/80 |
| 3,502,858 | 3/1970 | Habro et al. | 362/373 |
| 4,575,782 | 3/1986 | Levine et al. | 362/368 |
| 4,602,320 | 7/1986 | Tomkin et al. | 362/269 |

FOREIGN PATENT DOCUMENTS

| 88060 | 9/1983 | European Pat. Off. | 340/84 |
| 3148843 | 6/1983 | Fed. Rep. of Germany | 340/84 |
| 120425 | 9/1981 | Japan | 362/61 |
| 2069120 | 8/1981 | United Kingdom | 362/294 |
| 2139340 | 11/1984 | United Kingdom | 362/800 |

Primary Examiner—William A. Cuchlinski, Jr.
Assistant Examiner—D. M. Cox
Attorney, Agent, or Firm—Sughrue, Mion, Zinn, Macpeak, and Seas

[57] ABSTRACT

A vehicular lamp employing light-emitting diodes providing a good illumination efficiency, and which can be readily mounted on many different types of vehicles. The lamp includes a plurality of light-emitting diodes arranged on a supporting board, condenser lenses provided in front of each of the light-emitting diodes, and diffusion lenses arranged in front of the condenser lenses. A housing member supports the supporting board, the condenser lenses, and the diffusion lenses, the housing member having air holes formed therein to provide for ventilation. With this arrangement, the light produced by the light-emitting diodes is applied in the form of parallel beams to the front lens member by the condenser lenses, and the parallel light beams are diffused by the diffusion lenses on the front lens member. Accordingly, the front surface of the front lens member is illuminated in its entirety and illuminated uniformly.

32 Claims, 12 Drawing Figures

VEHICULAR LAMP

BACKGROUND OF THE INVENTION

The present invention relates to illuminating devices which can be suitably employed as vehicular lamps. Particularly, the invention concerns a vehicular lamp of a type which employs light-emitting diodes as its light source and which has an improved illumination effect.

Furthermore, the invention relates to such a vehicular lamps which can be suitably employed as a high-mount stop lamp and in which a lamp body thereof can be installed on different vehicle bodies merely by changing a mounting member of the lamp.

Recently, light-emitting diodes having a high luminance output have become available at a relatively low cost. Such light-emitting diodes have been considered as light sources for vehicular lamps such as brake lamps, tail lamps, and so-called "high-mount" stop lamp installed on the outside (or inside) of the rear part of a vehicle.

Light-emitting diodes are advantageous in such applications in a number of respects. First, since light-emitting diodes, unlike ordinary electric light bulbs, have no filament, their service life is semipermanent. Also, since the light-emitting diodes are free from filament burn out, it is seldom necessary to replace a diode. Still further, the mounting arrangement of light-emitting diodes can be relatively freely chosen in a vehicular lamp. That is, because of their small size, the thickness of the lamp can be reduced, and therefore the lamp can be easily mounted on the body of the vehicle. Further the lamp can be miniaturized due to the use of light-emitting diodes. Moreover, the amount of heat generated by a light-emitting diode is much smaller than for an ordinary light bulb of similar light output.

Figure 1:
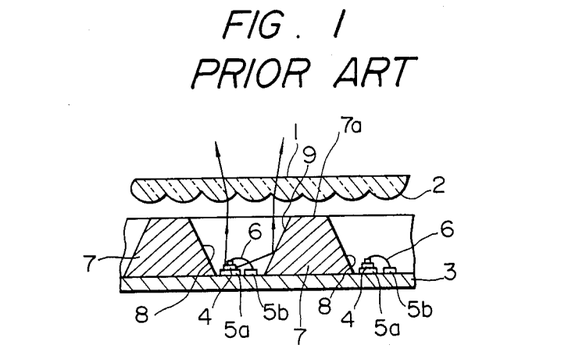
FIG. 1 is a sectional view showing essential components of a conventional vehicle lamp.

FIG. 1 shows a conventional vehicular lamp using light-emitting diodes. In FIG. 1, reference numeral 1 designates a front lens member on the inside of which a number of closely spaced diffusion lenses 2 (small convex lenses) are formed; 3, a printed circuit board disposed inside the front lens member 1; 4, a plural number of light-emitting diodes arranged at predetermined intervals on the printed circuit board 3; 5a and 5b, conductive metal foils; 6, lead wires; and 7, a diode segregating member arranged on the printed circuit board 3. The diode segregating member 7 is used to separate the light-emitting diodes 4 from one another. The diode segregating member 7 has a number of diode accommodating chambers 8 into which the light-emitting diodes 4 are received. The diode accommodating chamber 8 are each, for instance, in the form of a tapered hole, and the walls thereof serve as reflecting surfaces 9 so as to effectively utilize the light outputs from the diodes and to improve the illuminating efficiency.

In the conventional vehicle lamp thus constructed, the light output from each light-emitting diode 4 is reflected by the reflecting surface 9 to convert the point-light-source light to planar light. The planar light is then diffused by the diffusion lenses 2. However, when looking straight at the front lens member 1, it is possible to see the front surface 7a of the diode segregating member 7 through the front lens member 1 because of light refraction. Therefore, when the lamp is turned on, the surface of the front lens member 1 is not uniform in brightness; that is, the lamp does not provide uniform illumination.

This difficulty may be overcome by arranging adjacent ones the light-emitting diodes close to one another, but at the expense of increasing the number of light-emitting diodes. Furthermore, if the diodes are arranged excessively close to one another, the quantity of light emitting is actually decreased due to the accompanying increase in temperature (the output of a light-emitting diode decreases with increasing temperature).

In general, different vehicular lamps must be manufactured for different models or types of vehicles, and different types of lamps are installed at different positions on a vehicle. Therefore, lamps for one model of a vehicle or one location on a vehicle cannot be used for another model or location; that is, in general, vehicular lamps are not interchangeable. Further, in a vehicular lamp such as a high-mount stop lamp which is ordinarily installed by the user rather than the manufacturer of the vehicle, it is particularly uneconomical to manufacture and store different types of lamps for different models of vehicles. If such a lamp is manufactured for only one vehicle type, in the case where the user trades in his old automobile for a new automobile of a different model, he cannot use the lamps from the old automobile on the new automobile. Accordingly, there has been a strong demand for the provision of a vehicular lamp which can be installed on any model of vehicle merely by changing a few components thereof, and in which the lamp body is common for all models of vehicles.

SUMMARY OF THE INVENTION

Accordingly, an object of the invention is to provide a vehicular lamp composed of a number of light-emitting diodes in which the entire surface of the front lens member is uniformly illuminated.

Another object of the invention is to provide a vehicular lamp composed of a number of light-emitting diodes in which the decrease of illuminating efficiency due to heat generated by the light-emitting diodes is minimized.

A further object of the invention is to provide a vehicular lamp composed of a number of light-emitting diodes which is small both in size and in light in weight, and hence which is most suitable as a high-amount stop lamp for an automobile.

The foregoing and other objects of the invention have been achieved by the provision of a vehicular lamp which comprises: a plurality of light-emitting diodes arranged on a supporting board, condenser lenses provided in front of the respective light-emitting diodes, diffusion lenses arranged in front of the respective condenser lenses, and a housing member supporting the supporting board, the condenser lenses, and the diffusion lenses, the housing member having air holes formed therein.

The condenser lenses are substantially equal in size to diode accommodating chambers which are formed in a diode segregating member. The condenser lenses are arranged in correspondence to respective ones of the diode accommodating chambers in such a manner that each light-emitting diode is positioned at or near the focal point of the respective condenser lens. A number of diffusion lenses of a size smaller than the condenser lenses are formed on the inside of the front lens member.

Further, a vehicular lamp of the invention intended for use as a high-mount stop lamp comprises: a first lamp body in the form of a box having a front opening and a rear opening, a set of lens members coupled to the first lamp body in such a manner as to close the front opening, a supporting board arranged in the first lamp body, a number of light-emitting diodes arranged on the supporting board, a second lamp body coupled to the first lamp body in such a manner as to close the rear opening of the first lamp body, and a lamp mounting member detachably secured to the lower surface of the first lamp body and fixedly mounted on the vehicle body.

DESCRIPTION OF THE PREFERRED EMBODIMENTS

The invention will now be further described with reference to preferred embodiments shown in the accompanying drawings.

Figure 2:
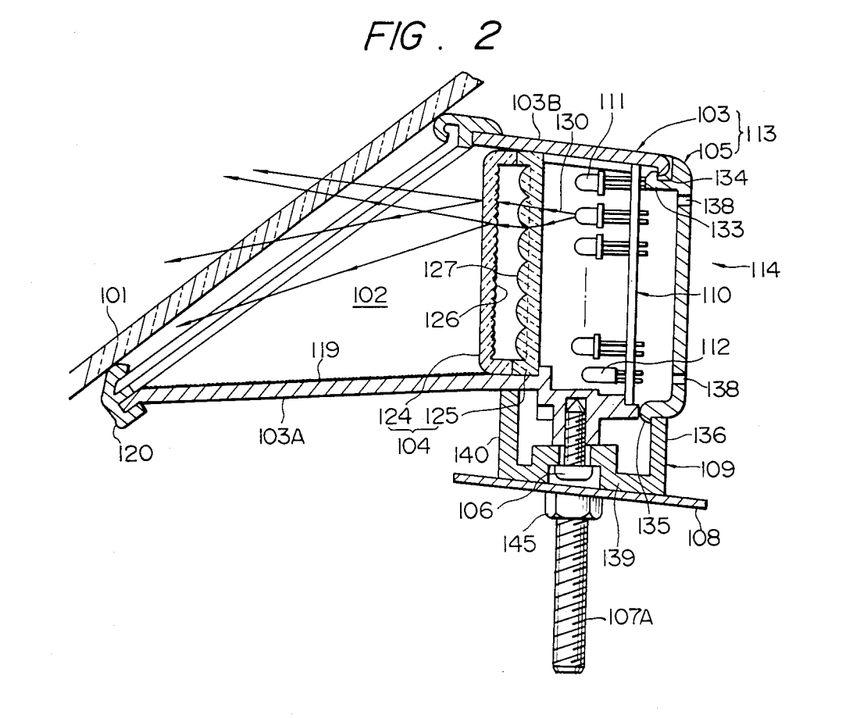
FIG. 2 is a sectional view of an example of a high-mount stop lamp to which the technical concept of the invention is applied.
Figure 3:
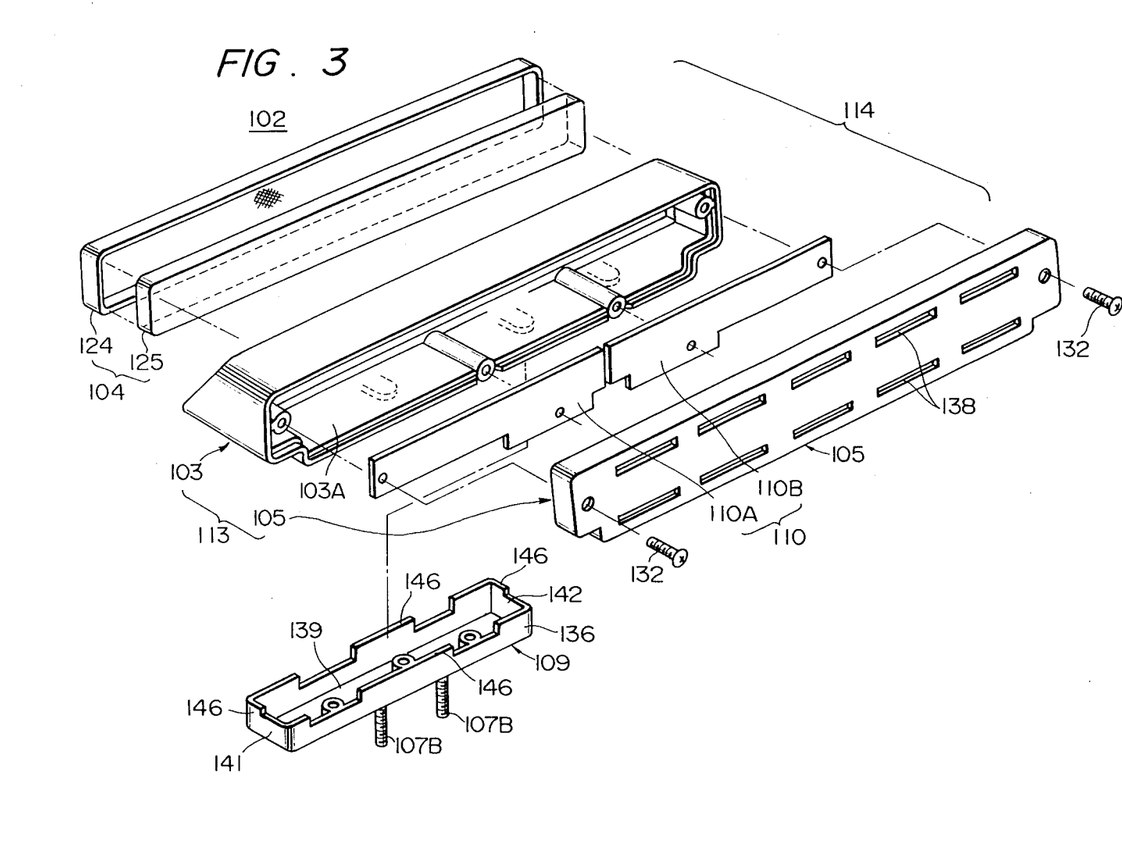
FIG. 3 is an exploded perspective view of the high-mount stop lamp shown in FIG. 2.

FIG. 2 is a sectional view of an example of a high-mount stop lamp to which the technical concept of the invention is applied, and FIG. 3 is an exploded perspective view of the lamp. In these figures, reference numeral 101 designates the rear window of an automobile, and 102, the high-mount stop lamp. The high-mount stop lamp 102 is composed of a first lamp body in the form of a box elongated horizontally and which has a front opening and a rear opening, a lens assembly 104 mounted in the first lamp body 103 in such a manner as to close the front opening of the first lamp body 103, a second lamp body 105 coupled to the first lamp body 103 in such a manner as to close the rear opening of the first lamp body 103, a lamp mounting member 109 detachably secured to the central portion of the lower surface of the first lamp body 103 with a pair of screws 106 and secured to the vehicle body (rear tray) with a pair of bolts 107A and 170B, a printed circuit board 110 arranged inside the first lamp body 103, and a plural number of light-emitting diodes 111 and resistors 112 for the light-emitting diodes installed on the surface of the printed circuit board 110. The first and second lamp bodies 103 and 105 form a main lamp body 113. The first and second lamp bodies 103 and 105, the lens assembly 104, the printed circuit board 110, the light-emitting diodes 111, and the resistors 112 form a main lamp body 114.

The first lamp body 103 can be made of a light metal such as aluminum, or it can be made of a plastic material. The front opening of the first lamp body 103 has an inclined edge which extends parallel to the rear window when the lamp is installed. In other words, the bottom plate 103A of the first lamp body 103 extends closer to the rear window 101 than the top plate 103B. The front part of the upper surface of the bottom plate 103A, which is located in front of the lens assembly 104, is knurled, thus providing a rough surface 119. The front opening of the first lamp body 103 is secured through a gasket 120 to the inner surface of the rear window 101.

The lens assembly 104 is made up of an outer lens 124 and an inner lens 125; that is, the lens assembly 104 is of a dual-lens structure. The outer lens 124, which is in the form of a bottomed box having a rear opening, is made of transparent glass or plastic colored red, for instance. The inner lens 125 is a condenser lens which is fixed to the outer lens 124 is such a manner as to close the rear opening of the box-shaped outer lens. The lens assembly 104 thus formed is secured to the inside of the first lamp body 103, for instance, by welding.

A number of diffusion lenses 126, which are convex lenses, are formed on the inner surface of the outer lens 124. The size of the diffusion lenses 126 is determined from the moldability of the material from which they are fashioned, the optical loss at the boundaries of the lenses 126, and the surface light emission characteristic due to the diffusion of light. Typically, the diffusion lenses have a diameter of the order of 0.7 mm to 1.8 mm. If their diameter is smaller than 0.7 mm, the diffusion lenses are difficult to mold and the number of boundaries between lenses is increased, with the result that the optical loss is increased. If the diameter is larger than 1.8 mm, the area of the boundaries which have no diffusing function is increased and the surface light emission characteristic of the lens 124 is lowered.

The inner lens 125 is preferably made of a transparent plastic such as acrylic resin. A number of condenser lenses 127 are formed on the inner surface of the inner lens 125 in correspondence to the light-emitting diodes 111. Each condenser lens 127 is a lens (fish-eye lens) which is substantially semispherical, having a radius of the order of 2.0 mm to 9.0 mm and a square bottom, each side of which has a length of the order of 4.0 mm to 18.0 mm. The sides have a length of at least 4.0 mm so that, where molded light-emitting diodes 111 are provided by covering a semiconductor chip, the condenser lenses 127 are substantially equal in diameter to the diodes 111 (about 4 mm in diameter). If each side of the square bottom is longer than about 18.0 mm, it is rather difficult to mold the condenser lenses 127 satisfactorily.

The lens assembly 104 is positioned so that the light-emitting diodes 111 are disposed in front of or at the focal points of the respective condenser lenses 127; that is, the diodes 111 are disposed at or closer to the inner lens 125 than the focal points. Therefore, when light beams 130 emitted by the light-emitting diodes 111 pass through the inner lens 125, the light beams are formed into parallel light beams by the respective condenser lenses 127. The condenser lenses 127 thus function to effectively convert the light-emitting diodes 111 from point light sources to planar light sources. When the parallel light beams 130 pass through the outer lens 124, the parallel light beams 130 are diffused by the diffusion lenses 124, thus illuminating the entire surface of the outer lens 124 uniformly.

The second lamp body 105 is engaged with the rear opening of the first lamp body 103 and with the lamp mounting member 109, and is secured to the first lamp body 103 with a pair of screws 132. A plurality of elastic engaging pieces 133 protrude inwardly from the periphery of the second lamp body 105. These elastic engaging pieces 133 are engaged with engaging parts 134 from the inside which are formed by bending the edge of the rear opening of the first lamp body 130 inwardly. The lower edge of the front opening of the second lamp body 105 is bent partially or in its entirety to form an engaging part or parts 135. The engaging part or parts 135 thus formed are engaged with the upper edge of the rear wall 136 of the lamp mounting member 109. The second lamp body 105 has a plurality of through-holes 138 used to radiate the heat generated by the resistors 112, thereby to positively protect the light-emitting diodes 111 from the heat.

The aforementioned printed circuit board 110 is divided into right and left circuit boards 110A and 110B. The circuit boards 110A and 110B are electrically connected and secured to the lamp body near the rear opening of the first lamp body 103.

The lamp mounting member 109 is substantially in the form of an elongated box which opens upwardly. The bottom plate 139 of the lamp mounting member 109 is positioned along the central axis of the first lamp body 103 and secured to the lower surface of the first lamp body 103 with a pair of screws 106 in such a manner that the upper edges of the front wall 140 and both side walls 141 and 142 abut against the lower surface of the first lamp body 103, and the upper edge of the rear wall 136 abuts against the lower surface of the second lamp body 105. The lamp mounting member 109 is integrally provided with a pair of bolts 107A and 107B, formed by insertion molding or staking, which penetrate the bottom plate 139 of the lamp mounting member 109. These bolts 107A and 107B are inserted into mounting holes (not shown) formed in the vehicle body 8, and nuts 145 are screwed on the bolts so that the lamp mounting member 109 is secured to the vehicle body 108. Positioning protrusions 146 extend from the upper edges of the front wall 140, the two side walls 141 and 142, and the rear wall 136 of the lamp mounting member 109. The protrusions 146 are engaged with grooves (not shown) formed in the lower surfaces of the first and second lamp bodies 103 and 105.

In general, the lamp mounting parts of the bodies of automobiles of different models or types are different in configuration. Therefore, a variety of lamp mounting members (109) should manufactured in conformance with the various lamp mounting part configurations, and a lamp mounting member (109) suitable for a given automobile is combined with the lamp body 114. In this manner, the same lamp body 114 can be used commonly for different models of vehicles. Accordingly, it is not necessary to manufacture different lamp bodies (114) for different automobiles, and the number of types of lamp bodies (114) can be reduced. The necessary metal molds can be readily produced, and the vehicular lamps can be facricated using only one manufacturing line. Furthermore, storage and care of the vehicular lamps thus manufactured can be readily achieved. Since the lamp mounting member 109 is a single part and is simple both in construction and in configuration, it can be manufactured at low cost, and therefore the cost of the lamp is not greatly affected by the lamp mounting part 109.

Figures 4, 5, 6:
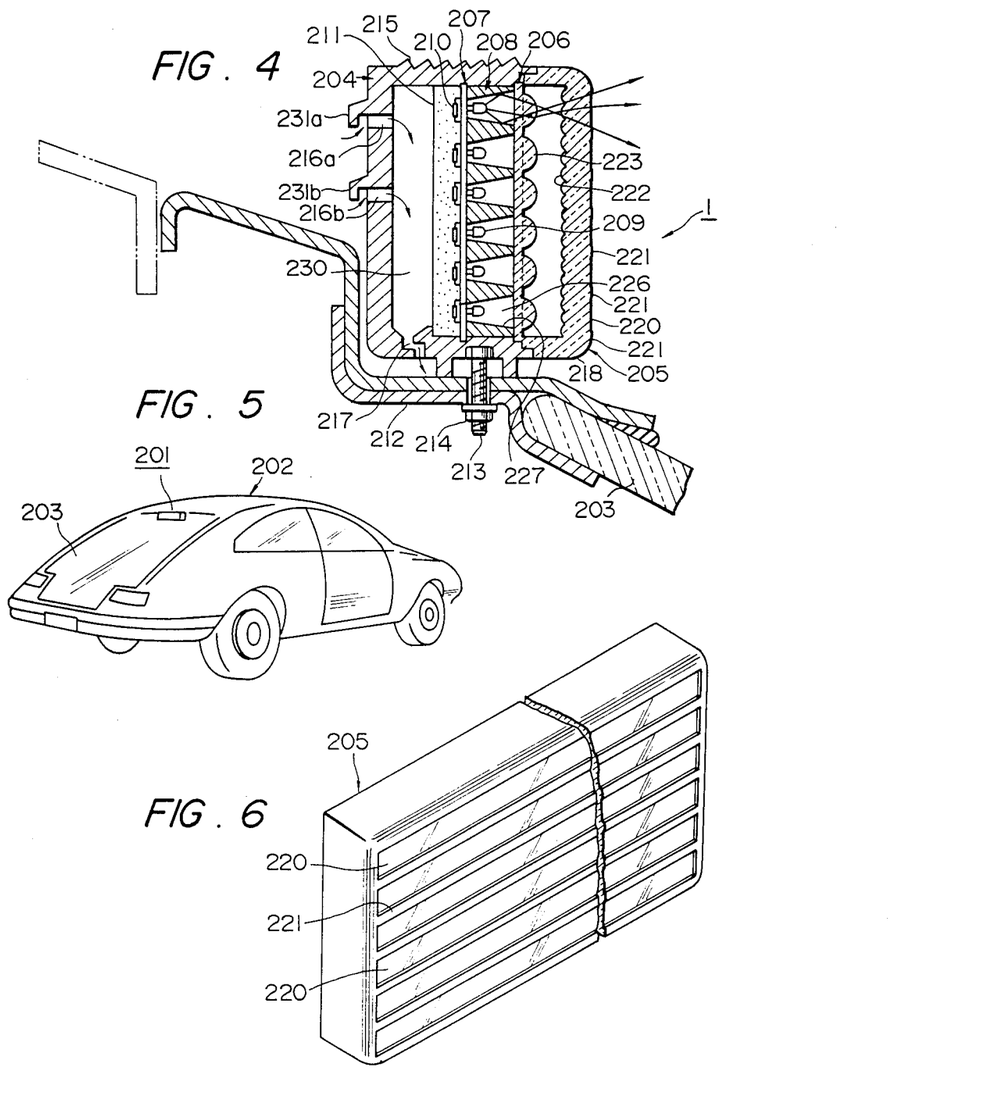
FIG. 4 is a sectional view of another example of a high-mount stop lamp according to the invention.
FIG. 5 is a perspective view of an automobile on which the high-mount stop lamp of FIG. 4 is mounted.
FIG. 6 is a perspective view, partially broken away, of a front lens member provided in the high-mount stop lamp of FIG. 4.
Figure 7:
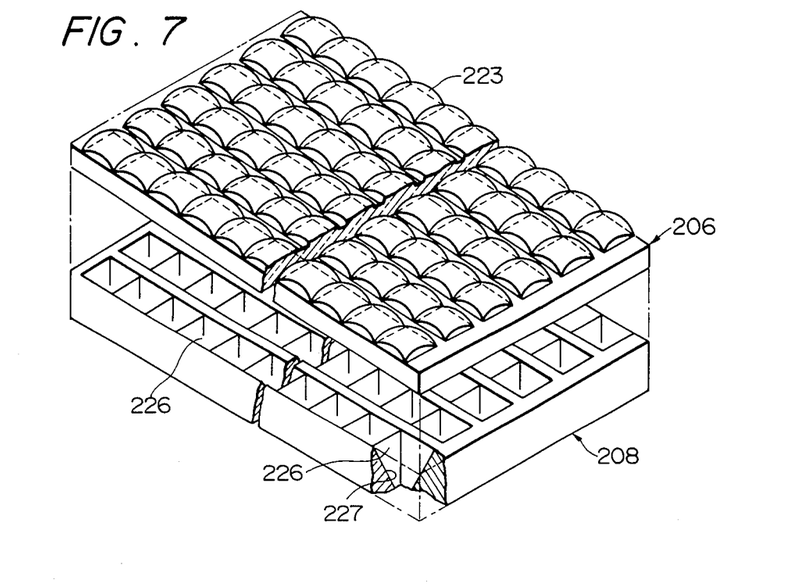
FIG. 7 is a perspective view, partially broken away, of a rear lens member and a diode segregating member in the high-mount stop lamp of FIG. 4.

FIG. 4 is a sectional view showing a high-mount stop lamp to which the technical concept of the invention is applied, FIG. 5 is an external view of an automobile equipped with the lamp, FIG. 6 is a perspective view, partially broken away, of a front lense member, and FIG. 7 is a perspective view, partially broken away, of a rear lens member and a diode segregating member.

In these figures, reference numeral 201 designates a high-mount stop lamp installed on the outside of the rear part of an automobile 202, for example, a rear window 203. The high-mount stop lamp 201 is composed of a box-shaped lamp body 204 opening rearwardly of the vehicle body, a front lens member 205 which closes the front opening of the box-shaped lamp body 204, a rear lens member 206 arranged inside the lamp body 204, a printed circuit board 207, a diode segregating member 208, a plural number of light-emitting diodes 209 arranged in a matrix on the front surface of the printed circuit board 206, and a number of resistors 210 installed on the rear surface of the printed circuit board 206, the resistors being molded with resin 211.

The lamp body 204, which is made of a material such as aluminum having an excellent heat radiation characteristic, is secured to the frame 212 of the rear window 203 with bolts 213 and nuts 214. The upper surface of the top plate of the lamp body 204 is knurled, as indicated generally at 215, to enhance the heat radiating effect. Two air holes 216a and 126b are formed in the upper portion of the rear wall of the lens body 204 to introduce air thereinto. A drain hole 217 is formed in the bottom plate of the lens body 204 near the vehicle body.

The front lens member 205 is made of transparent resin or glass, and may be colored red. A light-shielding film 218 is formed on the front surface of the front lens member 205 using a mask to thus provide light transmitting regions 220 and light blocking regions 221 on the front surface of the front lens member. The color of the light-shielding film 218 is the same as that of the vehicle body. As shown in FIG. 6, the light-transmitting regions 220 extend horizontally substantially over the width of the front lens member 205, and are spaced vertically at equal intervals. A number of small closely spaced convex lenses 222 are formed on the inner surface of the front lens member 205. The front lens member 205, together with the rear lens member 206, is fitted in the front opening of the lamp body 204. The rear lens member 206, made of a transparent synthetic resin such as acrylic resin, is placed in close contact with the front surface of the diode segregating member 208.

A number of condenser lenses 223 are formed on the front surface of the rear lens member 206 in correspondence to the light-emitting diodes 209, as shown in FIG. 4. More specifically, the condenser lenses 223 are formed in such a manner that they correspond in width to the aforementioned light-transmitting regions 220. Therefore, the condenser lenses 223 are arranged close to one another in the direction of width of the lamp 201, and are arranged in six lines spaced from one another by the width of the light blocking region 221 between the light transmitting regions 220 in the direction of height of the lamp 201. Each condenser lens 223 is a spherical lens, substantially in the form of a semisphere and having a substantially square bottom. The light-emitting diodes 209 are positioned at or near the focal points of the respective condenser lenses 223 so that light beams from the diodes 209 are applied to the front lens member 205.

The diode segregating member 208, made of opaque snythetic resin, has a number of diode accommodating chambers 226 which confront respective ones of the condenser lenses 223. As shown in FIG. 7, each diode accommodating chamber 226 is in the form of a through-hole having a prismoidal shape. The walls of the prismoidally shaped through-holes are reflecting surfaces, and the front openings thereof are substantially similar in configuration to the bottom of the condenser lens 223 and are larger in area than the rear openings. The light-emitting diodes 209 are inserted into the prismoid-shaped through-holes through the corresponding rear openings in such a manner that the diodes 209 are segregated from one another. If the diode segregating member 208 is made of a synthetic resin of a highly reflecting color such as white, reflection surfaces can be readily formed without the need for any special treatment. The diode segregating member 208 is bonded to the surface of the printed circuit board 207 with adhesive or the like.

The aforementioned resin 211 can be, for instance, an epoxy resin having an excellent heat conduction characteristic, the resin covering the resistors 210 and the entire rear surface of the printed circuit board 207. As the resistors 210 are covered with the resin 211, the heat generated by the resistors 210 is transmitted to the lamp body 204 satisfactorily. That is, the resin 211 is effective in improving the heat radiation of the lamp 201.

In the case of a lamp using a large number of light-emitting diodes, heat generated by the latter cannot be disregarded because, as the temperature of the lamp increases, the light-emitting efficiency of the diodes is reduced, and accordingly the output intensity thereof is decreased. In the lamp of the invention, the heat is transmitted through the resin 211 to the lamp body 204 and thus is radiated through the entire surface of the lamp body 204. Moreover, the air introduced through the air holes 216a and 216b into the lamp body 204 cools the resin 211 to further improve the heat radiation efficiency. For this purpose, a space 230 communicated with the air holes 216a and 216b and the drain hole 217 is formed in the lamp body 204. Air or water which enters the space 230 is discharged through the drain hole 217. Eaves 231a and 231b are provided for the air holes 216a and 216b, respectively to prevent the entrance of water or rain. The drain hole 217 is bent in order to prevent the entrance of water or rain from below.

In the above-described high-mount stop lamp, the light shielding film 218 is formed on the surface of the front lens member 205 using a mask to provide the light transmitting regions 220 and the light blocking regions 221 in the surface of the front lens member 205. Accordingly, the light transmitting area of the front lens member 205 is decreased. Therefore, although the intensity of the output light from each diode 209 is maintained unchanged, the average luminance of the lamp is decreased, which eliminates the difficulty of the driver of a following vehicle being dazzled by the stop light.

A characteristic of the human eye is that, when an observed is a short distance from the stop lamp where the light transmitting regions 220 and the light blocking regions 221 can be distinguished, the output of the lamp is perceived merely in terms of luminance, while when the observed is at a long distance from the lamp, the output of the lamp is perceived in terms of both brightness and luminance. Therefore, in accordance with the invention, the average luminance of the lamp is reduced, thereby preventing the emission of a dazzling light beam. In accomplishing this, the luminance of each light-emitting diode is not reduced, however, and therefore the lamp meets required light distribution standards and the function of the lamp is maintained unchanged.

The light-emitting diodes 209 are segregated from one another by the diode segregating member 208, and the light beams therefrom are reflected forwardly by the reflecting surfaces. Therefore, the light beams are effectively applied to the light transmitting regions 220.

The resistors 210 through which flow the diode currents are covered with the resin 211, as described above. Therefore, the resistors are provided with excellent vibration resistance and water resistance, which contributes to improving the durability of the lamp 201.

Figure 8:
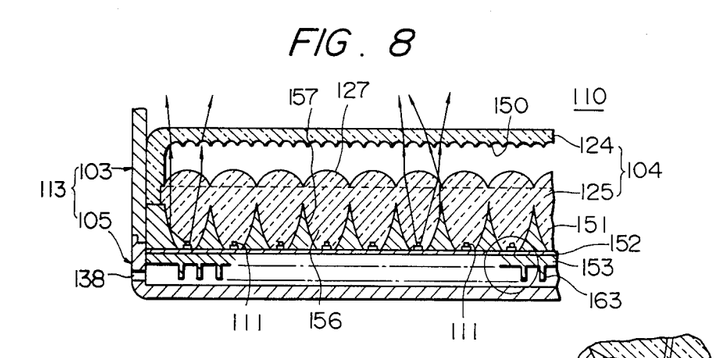
FIG. 8 is a sectional view showing essential components of a third example of a high-mount stop lamp according to the invention.
Figures 9, 10:
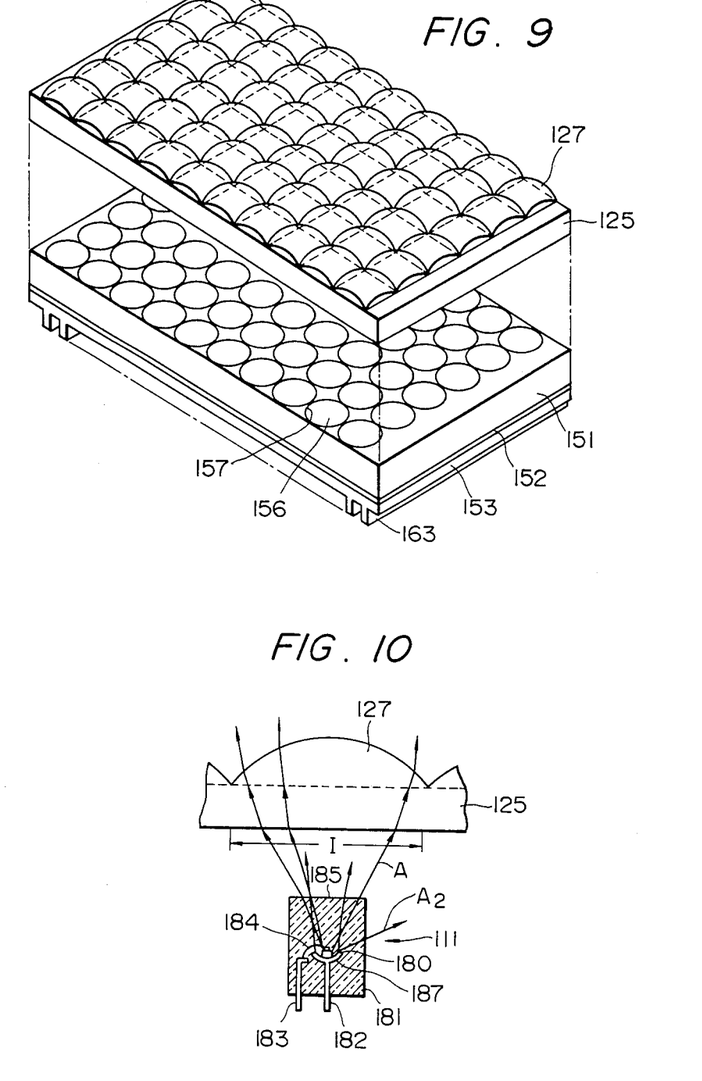
FIG. 9 is a perspective view, partially broken away, of an inner lens member and a diode segregating member in the high-mount stop lamp of FIG. 8.
FIG. 10 is a sectional view showing another example of a light-emitting diode.
Figure 12:
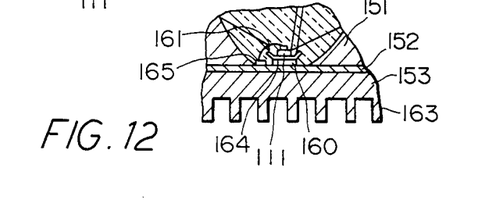
FIG. 12 is a blow-up of a particular portion of the high-mount stop lamp of the embodiment of FIG. 8.

FIG. 8 is a sectional view showing essential components of another embodiment of the invention, and FIG. 9 is a perspective view of an inner lens member and a diode segregating member employed therein. FIG. 12 is a blow-up of the circled portion of FIG. 8. This embodiment differs from the embodiment described with reference to FIGS. 4 through 7 in the following points (but is substantially the same otherwise): A number of closely spaced diffusion lenses 150 in the form of small concave lenses are provided on the inner surface of an outer lens member 124. An inner lens member 125 is made integral with a diode segregating member 151, and light-emitting diodes 111 are molded therein. A support board 153 is mounted through an insulation film 152 on the rear surface of the diode segregating member 151. The light-emitting diodes 111 are of the non-molded type, that is, they are in the form of semiconductor chips which are not protected by a cover.

The diode segregating member 151, which is in the form of a plate made of opaque plastic, has a number of diode accommodating holes 156 which receive respective ones of the light-emitting diodes 111. Each diode accommodating hole 156 is a through-hole whose walls form a parabolic reflecting surface 157. The front openings of the diode accommodating holes 156 are substantially equal in size to the condenser lenses 127 of the inner lens members 125 and confront the respective condenser lenses 127.

The board 153 is made of aluminum. The light-emitting diodes 111 are mounted through the insulating film 152 on the board 153. The light-emitting diodes in each row (or each column) are series-connected to one another and parallel-connected to the power source with conductive metal foils 161 and lead wires 162, completely the same as in the embodiment described with reference to FIGS. 4 through 7.

In order to effectively radiate heat, a number of fins 163 are provided which protrude from the rear surface of the board 153. In FIGS. 8 and 12, reference numeral 164 designates a substantially dish-shaped terminal seat disposed between the light-emitting diode 111 and the conductive metal foil 161. The terminal seat 164 may be made of aluminum, for instance. The inclined circumferential wall of the terminal seat 164 serves as a reflecting surface.

The light emitted obliquely from the light-emitting diode 111 is reflected forwardly by the reflecting surface 157 and the terminal seat 164 of the diode accommodating hole 156. Therefore, the outer lens member 124 is illuminated more effectively.

In the illuminating device of the invention, condenser lenses substantially equal in size to the diode accommodating chambers of the diode segregating member are arranged in correspondence to the diode accommodating chambers, the light-emitting diodes in the diode accommodating chambers are positioned at or near the focal points of the condenser lenses, and a number of closely spaced diffusion lenses smaller than the condenser lenses are formed on the inner surface of the outer lens member. With this arrangement, the light from the light-emitting diodes is diffused when it passes through the outer lens members, and therefore the lamp can be easily seen even from an oblique angle.

The light beams from the light-emitting diodes are converted into parallel light beams by the condenser lenses arranged in correspondence to the diode accommodating chambers. Therefore, the light from point light sources is converted to planar form, and hence the surface of the outer lens member is substantially uniformly illuminated; that is, an excellent illumination effect is obtained. Furthermore, when an observer looks directly at the outer lens member, neither the surface of the diode segregating member nor the insides of the diode accommodating chambers can be seen because the diffusion lenses and the condenser lenses are bright. This means that the illuminating device of the invention provides an excellent illumination effect.

FIG. 10 is a sectional view showing another example of a light-emitting diode which can be used in the vehicular lamp according to the invention.

The light-emitting diode 111 shown in FIG. 10 is of a molded type which is made up of a semiconductor chip 180, a transparent resin part 181, a pair of lead wires 182 and 183, and a metal wire 184. The transparent resin part 181 can be made of epoxy resin, for instance, and it is in the form of a cylinder. The end face of the transparent resin part 181, which confronts the inner lens member 125, in a diffusion surface 185 which acts to diffuse the light emitted forwardly from the semiconductor chip 180. The semiconductor chip 180, the lead wires 182 and 183, and the metal wire 184 are molded in the cylindrical resin part 181. The semiconductor chip 180 is fixedly mounted on a substantially dish-shaped chip mounting part 187 provided at the inner end of the lead wire 182, and is connected through the metal wire 184 to the other lead wire 183. The chip mounting surface of the chip mounting part 187 is a parabolic reflecting surface. The lead wires 182 and 183 extend out of the transparent resin part 181 and are connected to the printed circuit board (not shown).

Of the rays emitted by the semiconductor chip 180, those A which emerge from the the diffusion surface 185 of the transparent resin part 181 are refracted and diffused by the diffusion surface 185. Therefore, the rays A substantially uniformly illuminate the region I of the rear surface of the inner lens member 125 which covers the condenser lens 127 provided for the diode. The rays A are converted into parallel rays substantially parallel to the optical axis upon passing through the condenser lens 127. Of the rays emitted by the semiconductor chip 180, those $A_2$ which emerge forwardly at an oblique angle from the cylindrical wall of the transparent resin part 181 are reflected forwardly by the reflecting surface of the diode accommodating hole 156. Therefore, the rays $A_2$ will not enter the other condenser lenses 127 adjacent to the condenser lens 127 provided for the diode.

Figure 11:
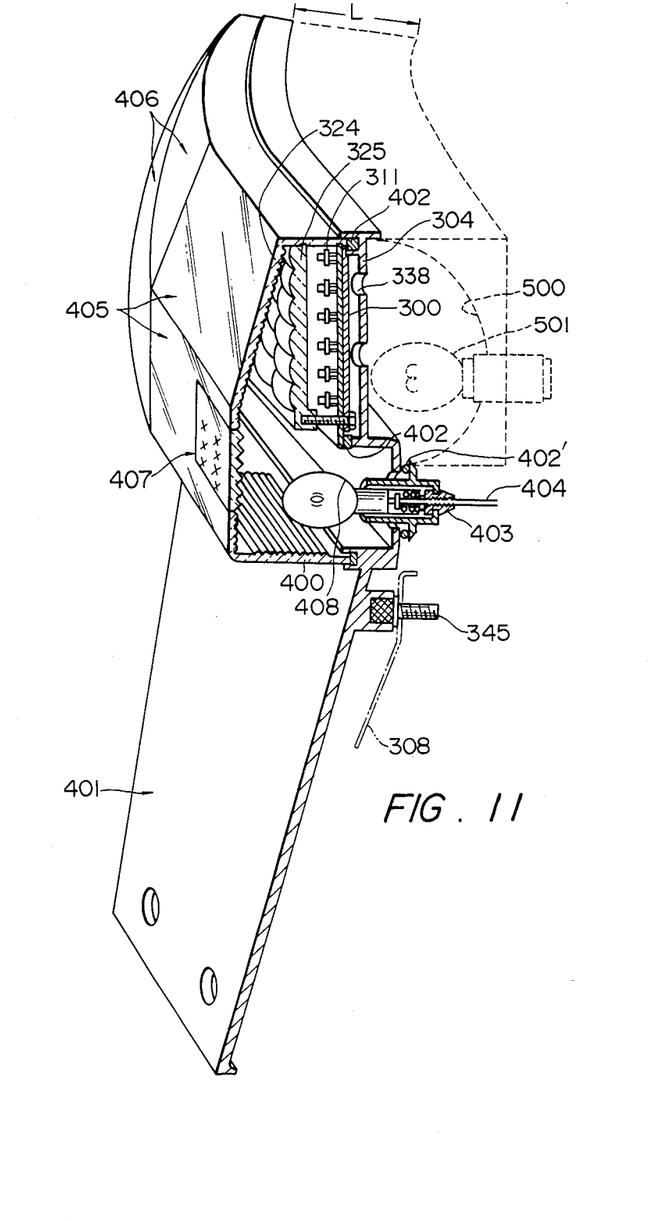
FIG. 11 is a perspective view, with parts cut away, of a tail lamp for a two-wheeled vehicle to which the technical concept of the invention is applied

FIG. 11 is a perspective view, with parts cut away, showing a two-wheeled vehicle (motorcycle or the like) tail lamp to which the technical concept of the invention is applied. In FIG. 11, broken lines indicate a conventional construction using a light bulb.

As shown in FIG. 11, a lamp body 304 is fixedly mounted on a vehicle body, for instance, on a rear fender 308, with bolts 345. The lamp body is integral with a license plate mounting board 401. A number of light-emitting diodes 311, an inner lens member 325, and an outer lens member 324 are secured through a packing 402 to the lamp body 304 and the light-emitting diodes 311 to prevent the entrance of water. The central portion of the upper part of the outer lens member 324 is colored red, for instance, as is suitable for a tail lamp 405. Both sides of the tail lamp 405 are colored yellow, for instance, thus defining a right turn lamp 406 and a left turn lamp 406. A reflector 407 is installed at the center of the lower part of the tail lamp 405 to reflect light from the following vehicle. The horizontal portion of the outer lens part 324, which is located below the tail lamp 405, is formed into a lens 400 for illuminating the license plate. A license plate illuminating light bulb 408 is installed through a packing 402' on the lamp body 304. In FIG. 11, reference numeral 338 designates air holes; 404, a cord; and 403, a bushing. If, similar to the case of the tail lamp, light-emitting diodes and an inner lens member are additionally provided to illuminate the license plate, the license plate illuminating light bulb can be eliminated.

While the vehicle is running at night, ordinarily electric current is supplied through a resistor to the tail lamp 405 at a current level such that the brightness of the tail lamp 405 is relatively low; however, when the vehicle is braked, electric current flows directly to the tail lamp 405 so that the brightness of the latter is increased.

If the light bulb 501 of the conventional tail lamp of a two-wheeled vehicle burns out, it is considerably dangerous for the driver to operate the vehicle. On the other hand, the tail lamp according to the invention is free from such a difficulty because it employs light-emitting diodes. Furthermore, as is apparent from FIG. 11, because the tail lamp is quite shallow, the degree of freedom in designing the lamp body, and accordingly the vehicle body, is increased.

As is apparent from the above description, in the vehicular lamp according to the invention, the light from the light-emitting diodes is applied as parallel light beams to the front lens member by the condenser lenses provided in correspondence to the diode accommodating chambers, and the parallel light beams are diffused by the diffusion lenses on the front lens member. Therefore, the front surface of the front lens member is illuminated in its entirety, and when an observer views the lamp, he cannot see the inside thereof because the front lens member is bright at any angle.

Also in accordance with the present invention, one or more air holes are formed to provide air communication between the inside and outside of the lamp, which is effective in allowing heat discharge to thereby maintain the efficiency of the light-emitting diodes.

Furthermore, in the vehicular lamp of the invention, the front lens member is provided with light transmitting regions and light blocking regions to control the quantity of light radiated from the lamp; that is, only the light transmitting regions are illuminated. Therefore, it is unnecessary to further miniaturize the lamp. Moreover, in the vehicular lamp of the invention, although the luminance of the light-emitting diodes is maintained unchanged, the average luminance of the lamp is decreased, which eliminates the difficulty of the driver in the following vehicle being dazzled by the lamp.

Still further, according to another aspect of the invention, since the lamp body is designed so that the lamp can be used commonly for a variety of automobile types, it is necessary to change only the lamp mounting member. Accordingly, the number of types of vehicular lamps that the maufacturer must produce can be decreased. Also, vehicular lamp of the invention can be readily manufactured at low cost, and the lamp of the invention is suitable as a high-mount stop lamp which can be installed where required.

What is claimed is:

1. A vehicular lamp comprising:
   a supporting board (210);
   a plurality of light-emitting diodes (209) arranged on said supporting board;
   condenser lenses (223) provided in front of respective ones of said light-emitting diodes;
   diffusion lenses (222) arranged in front of said condenser lenses; and
   a housing member (204) supporting said supporting board, said condenser lenses, and said diffusion lenses, said housing member having air holes (216) formed therein, and said diodes are arranged on one side of said supporting board, and the other side of said supporting board and walls of said housing member form a chamber, said air holes being provided in the walls of said housing which form said chamber.

2. The vehicular lamp as claimed in claim 1, in which said condenser lenses and said diffusion lenses are convex lenses.

3. The vehicular lamp as claimed in claim 1, in which a radius of curvature of said diffusion lenses is smaller than a radius of curvature of said condenser lenses.

4. The vehicular lamp as claimed in claim 1, in which each said light-emitting diode is positioned at or near a focal point of the respective condenser lens.

5. The vehicular lamp as claimed in claim 1, in which said housing member comprises: a first lamp body which is the form of a box having a front opening and a rear opening; a second lamp body secured to said lamp body in such a manner as to close said rear opening of said first lamp body; and a lamp mounting member detachably secured to a lower surface of said first lamp body and fixedly mounted on a vehicle body.

6. The vehicular lamp as claimed in claim 5, in which said condenser lenses and said diffusion lenses are mounted on said first lamp body in such a manner as to close said front opening of said first lamp body, and said supporting board is arranged in said first lamp body.

7. The vehicular lamp as claimed in claim 5, in which said second lamp body is elastically engaged with said first lamp body.

8. The vehicular lamp as claimed in claim 1 or 5, in which said air holes are formed in said second lamp communicating the inside of said housing member with the outside.

9. The vehicular lamp as claimed in claim 5, in which said lamp mounting member is replaceable.

10. The vehicle lamp as claimed in claim 5, further comprising means for installing said housing member on the inside of a rear window of a vehicle.

11. The vehicular lamp as claimed in claim 1, in which said housing member comprises a lamp body in the form of a box, said box having an opening facing rearwardly of a vehicle body, said lamp body being mounted through a lower surface thereof to said vehicle body.

12. The vehicular lamp as claimed in claim 11, in which said condenser lenses and said diffusion lenses are secured to the opening of said lamp body in such a manner that said condenser lenses and said diffusion lenses are inside said lamp body.

13. The vehicular lamp as claimed in claim 12, in which an upper surface of said lamp body is roughened.

14. The vehicular lamp as claimed in claim 12, in which said air holes are formed in an upper portion of a rear wall of said lamp body.

15. The vehicular lamp as claimed in claim 11, in which said housing member is mounted on the outside of a rear window of said vehicle body.

16. The vehicular lamp as claimed in claim 1, further comprising: a diode segregating member having a plurality of diode accommodating chambers which surround respective ones of said light-emitting diodes, wherein each condenser lens is substantially equal in size to an opening of a respective diode segregating chamber formed in one side of said diode segregating member, the other side of which is secured to said supporting board.

17. The vehicular lamp as claimed in claim 16, in which each of said diode accommodating chambers is tapered, and the opening thereof in the other side of said diode segregating member is smaller than the opening thereof in the one side of said diode segregating member.

18. The vehicular lamp as claimed in claim 11, further comprising light shielding films formed at predetermined intervals on the outside of a plate on the inside of which said diffusion lenses are formed, thus providing light transmitting regions and light blocking regions alternately thereon.

19. The vehicular lamp as claimed in claim 16, in which said diode segregating member is made of an opaque material, and walls of each of said diode accommodating chambers reflect light from the respective light-emitting diode towards the respective condenser lens.

20. The vehicular lamp as claimed in claim 1, further comprising terminal seats disposed between said supporting board and respective ones of said light-emitting diodes, each terminal seat having a peripheral part inclined towards the respective condenser lens to thus provide a reflecting surface.

21. The vehicular lamp as claimed in claim 17, in which each of said diode accommodating chambers is pyramidally shaped.

22. The vehicular lamp as claimed in claim 1, in which each of said light-emitting diodes comprises: a semiconductor chip, a transparent resin part, a pair of lead wires, and a metal wire, said semiconductor chip, lead wires and metal wire being molded in said transparent resin part.

23. The vehicular lamp as claimed in claim 22, in which each of said light-emitting diodes further comprises: a semiconductor chip mounting part molded in said transparent resin part, said semiconductor chip mounting part having a chip receiving surface which serves also as a parabolic reflecting surface.

24. The vehicular lamp as claimed in claim 1, further comprising means for mounting said housing member on a rear fender of a two-wheeled vehicle.

25. The vehicular lamp as claimed in claim 24, in which an outer surface of a plate, on an inner surface of which said diffusion lenses are formed, provides a tail lamp region, a pair of direction indicating regions, and a reflective reflector region.

26. The vehicular lamp as claimed in claim 25, in which said housing member is integral with a license plate mounting board, and an outer surface of said plate further provides a license plate illuminating region.

27. A vehicular lamp comprising:
 a supporting board (210);
 a plurality of light-emitting diodes (209) arranged on said supporting board;
 condenser lenses (223) provided in front of respective ones of said light-emitting diodes.
 diffusion lenses (222) arranged in front of said condenser lenses;
 a housing member (204) supporting said supporting board, said condenser lenses, and said diffusion lenses, said housing member having air holes (216) formed therein; and
 a diode segregating member having a plurality of diode accommodating chambers which surround respective ones of said light-emitting diodes, wherein each condenser lens is substantially equal in size to an opening of a respective diode segregating chamber formed in one side of said diode segregating member, the other side of which is secured to said supporting board,
 wherein one side of said supporting board opposite the side on which said diode segregating member is provided is covered with a resin of a type in which said light-emitting diodes are molded.

28. A vehicular lamp comprising:
 a supporting board (210);
 a plurality of light-emitting diodes (209) arranged on said supporting board;
 condenser lenses (223) provided in front of respective ones of said light-emitting diodes;
 diffusion lenses (222) arranged in front of said condenser lenses;
 a housing member (204) supporting said supporting board, said condenser lenses, and said diffusion lenses, said housing member having air holes (216) formed therein; and
 a diode segregating member having a plurality of diode accommodating chambers which surround respective ones of said light-emitting diodes, wherein each condenser lens is substantially equal in size to an opening of a respective diode segregating chamber formed in one side of said diode segregating member, the other side of which is secured to said supporting board,
 wherein said condenser lenses occupy respective ones of said diode accommodating chambers and are integral with said diode segregating member.

29. The vehicular lamp as claimed in claim 28, in which each of said diode accommodating chambers is parabolic in section.

30. A vehicular lamp comprising:
 a supporting board (210);
 a plurality of light-emitting diodes (209) arranged on said supporting board;
 condenser lenses (223) provided in front of respective ones of said light-emitting diodes;
 diffusion lenses (222) arranged in front of said condenser lenses;
 a housing member (204) supporting said supporting board, said condenser lenses, and said diffusion lenses, said housing member having air holes (216) formed therein; and
 a diode segregating member having a plurality of diode accommodating chambers which surround respective ones of said light-emitting diodes, wherein each condenser lens is substantially equal in size to an opening of a respective diode segregating chamber formed in one side of said diode segregating member, the other side of which is secured to said supporting board,
 wherein said supporting board has a plurality of fins (103) on a rear side thereof.

31. The vehicular lamp as claimed in claim 1, wherein a drain hole (217) is provided in said housing member.

32. The vehicular lamp as claimed in claim 1, further comprising means for defining a bent drain hole in said housing.

* * * * *